United States Patent [19]

Bruder

[11] 4,400,452
[45] Aug. 23, 1983

[54] LAMINAR ELECTRICAL CELLS AND BATTERIES

[75] Inventor: Alan H. Bruder, Burlington, Mass.

[73] Assignee: Polaroid Corporation, Cambridge, Mass.

[21] Appl. No.: 334,375

[22] Filed: Dec. 24, 1981

[51] Int. Cl.³ .............................................. H01M 6/46
[52] U.S. Cl. .................................. 429/152; 429/162; 429/199
[58] Field of Search ............... 429/152, 162, 199, 201, 429/206, 207, 229–231, 224

[56] References Cited

U.S. PATENT DOCUMENTS

| | | | |
|---|---|---|---|
| 2,399,127 | 4/1946 | Lipinski | 429/201 |
| 2,403,571 | 7/1946 | Wilke | 429/201 |
| 3,416,968 | 12/1968 | Banks | 429/201 |
| 4,086,400 | 4/1978 | Hyland et al. | 429/122 |
| 4,105,815 | 8/1978 | Buckler | 429/152 |

Primary Examiner—Anthony Skapars
Attorney, Agent, or Firm—John W. Ericson

[57] ABSTRACT

Laminar electrical cells and batteries of the Leclanché type, in which the electrolyte comprises an aqueous solution containing from about 18 to about 22 percent of $NH_4Cl$ and from about 25 to about 40 percent of $ZnCl_2$ by weight, based on the weight of solution. The electrolyte may contain a gelling agent, and may initially contain a minor amount of mercuric chloride.

4 Claims, 5 Drawing Figures

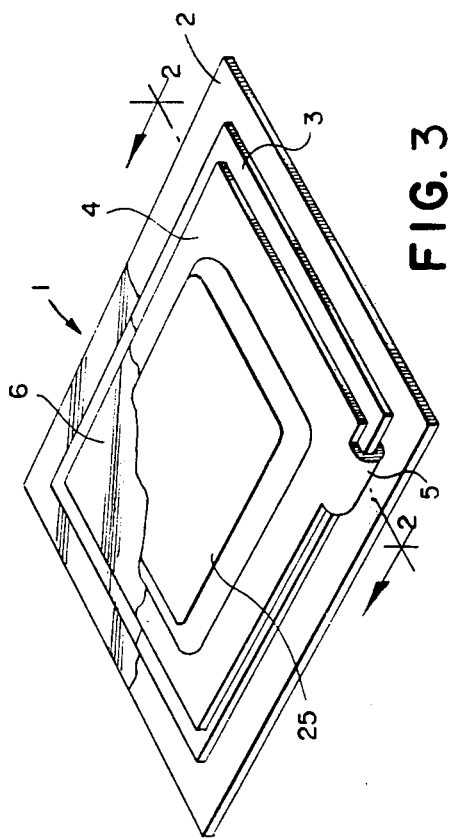
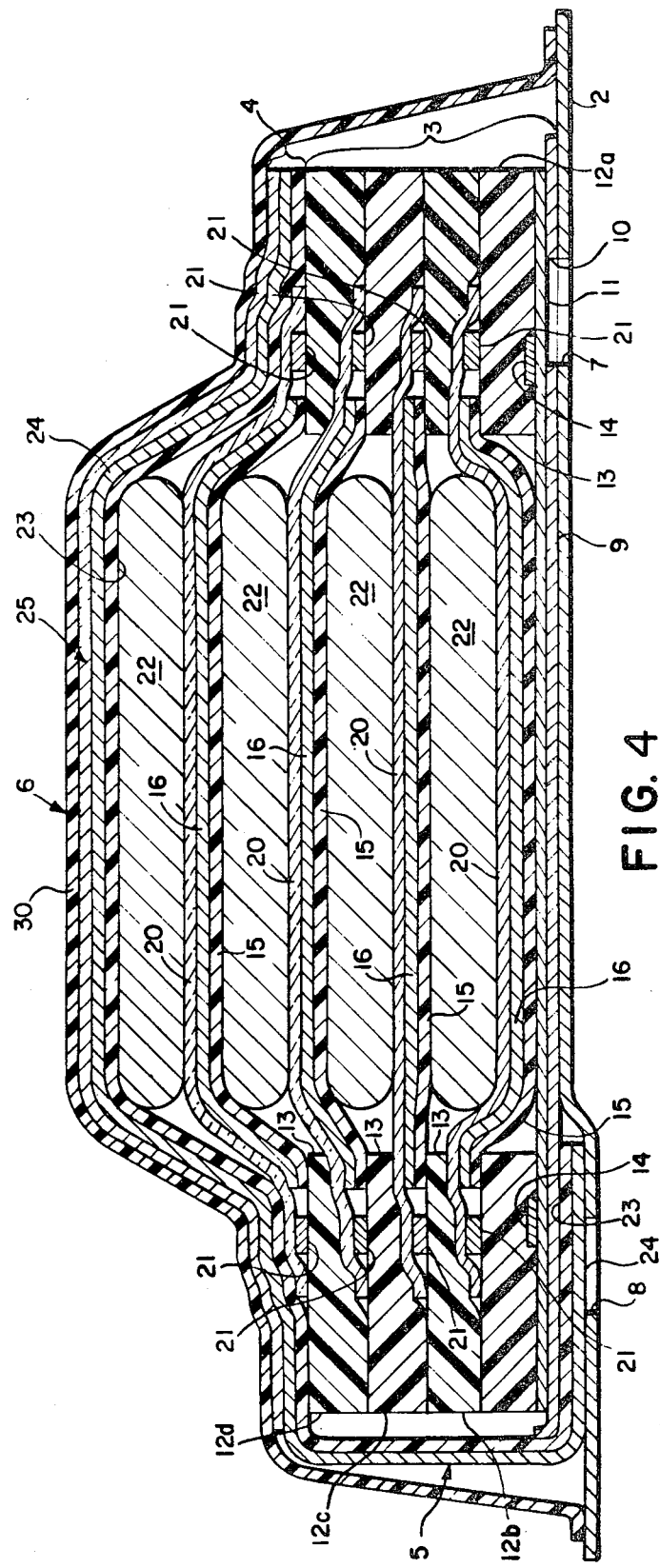
FIG. 3
FIG. 4

LAMINAR ELECTRICAL CELLS AND BATTERIES

This invention relates to electrical cells and batteries, and particularly to a novel electrolyte composition for laminar batteries.

Thin, flat laminar batteries are currently manufactured and sold as a component of the Polaroid SX-70 Land film pack, by Polaroid Corporation of Cambridge, Mass. The battery serves as the power source for various automatic cameras adapted to accept the film pack, such as the Polaroid SX-70 Land Camera. One form of battery suited for this purpose, and its method of manufacture, are shown and described in U.S. Pat. No. 4,019,251, issued on Apr. 26, 1977 to Thomas P. McCole for Flat Battery and Method of Manufacture, assigned to the assignee of this invention, which is hereby incorporated herein by reference.

Reference is made to the above-cited U.S. Pat. No. 4,019,251 for details of the construction and manufacture of batteries of the kind here considered, Briefly, these batteries are made by assembling thin, flat laminar components including central active electrode regions in ionic communication through layers of gel electrolyte, and electronically connected in series through thin, flat conductive plastic intercell connectors and terminal collectors. The central active regions are surrounded by liquid impervious borders formed by interdigitating the conductive plastic layers with adhesive insulating layers, and sealing these border regions together with heat and pressure.

By careful manufacturing and inspection procedures, excellent yields have been attained in the manufacture of batteries of the kind described in large quantities. However in large scale manufacture, even very small percentage yield losses present a compelling incentive for yield loss reduction.

Of the variety of causes that occasionally result in the production of defective batteries, most lead to readily observable defects in the assembled battery, such as misplaced or missing components, which are traceable to assembly machinery that is in need of adjustment or repair. A residuum of batteries exhibit a low open circuit voltage (OCV), or closed circuit voltage (CCV), either immediately upon assembly or after a period of storage, although apparently assembled and sealed properly. One object of this invention is to reduce the incidence of defective batteries without gross structural anomalies.

Upon dissection of batteries of the kind described above, which were found to have low OCV's for no apparent reason, it was found that in many of them, there was one cell that was dried out, with other cells being of normal appearance and without any appreciable loss in weight of the battery. Briefly, the invention is organized about the hypothesis, adopted in an attempt to rationalize the observed phenomenon, that laminar series connected batteries of Leclanché cells may be subject to an avalanche effect triggered by a small chemical difference between one cell and its neighbors that results in the migration of water out of the affected cell, thus enhancing the original imbalance. The result could be a dried cell in series with electrically unimpaired cells, causing a drastic increase in internal impedance and loss in battery capacity. While it is not desired to be bound by any theoretical explanation of the observed phenomenon, which may in fact turn out to arise through various mechanisms, it is thought to be principally occasioned by a local increase in pH that favors the precipitation of $Zn(NH_3)_2Cl_2$ through a reaction sequence that encourages the diffusion of water through the adjacent electrode and intercell connector barriers into adjacent cells. Whatever the true cause, in accordance with the invention the incidence of this phenomenon can be greatly reduced by a modification of the battery chemistry to make the cells extremely resistant to pH changes. Basically, this modification consists in materially increasing the amount of $ZnCl_2$ incorporated in the electrolyte, without appreciably reducing the amount of $NH_4Cl$.

Laminar Leclanché cells in batteries of the kind described above comprise zinc anodes formed as patches of zinc powder with a little carbon black, cohered, and adhered to a conductive plastic substrate, with a binder. A gel electrolyte layer is deposited over the anode. A separator is added, another layer of gel electrolyte is deposited, and a dry patch cathode formed as a mixture of $MnO_2$ and carbon adhered to a conductive plastic substrate with a binder is placed over the second layer of gel electrolyte.

Variables affecting the exact structure and chemical composition of cells made in this apparently simple way are quite numerous because of the inevitable tolerances in the manufacturing processes used to produce the cells. In particular, the zinc powder is characterized by a particle size distribution and a shape population, as well as by trace element concentrations that may vary from batch to batch, and by the occurrence of more or less ZnO. The bound zinc matrix may have a microscopic structure that is affected by such process variables as web speed, drying temperatures, coating weight, patch size, and the like. The gel electrolyte is subject to composition tolerances, both in formulation and in application; as to the latter, variations in the temperature and relative humidity of the assembly room may play a part. Moreover, the quantities delivered by the extruders used to apply the gel layers to the battery components during assembly inevitably vary somewhat from patch to patch laid down by a given extruder, and from extruder to extruder. The cathode is similarly subject to variations in composition, weight and internal structure. Obviously, the conceptually ideal solution of reducing all of these tolerances to zero is not available to the manufacturer.

Historically, the manufacture of batteries of series connected laminar Leclanché cells has been governed by the principle that such cells are cathode limited in performance, and will work equally well, if properly assembled, so long as all of the components are present, with an available energy content that depends primarily on how much of the cathode material has been reduced in service. In this view, the most important criteria are the presence of all components, and the integrity of the seals. As applied to the anode layer of gel electrolyte, the implication is a weight tolerance restriction that will ensure enough to cover the anode, but not enough to get into the seal area. Since the particular stoichiometric relationship between the amount of electrolyte and the weight of anode or cathode has not been considered as a matter of concern, tolerances permitting excursions of from forty to sixty percent in the weight of electrolyte per cell, which meet these mechanical requirements, and which are compatible with commensurate tolerances in anode and cathode weights, have been long considered acceptable.

In accordance with the invention, a different view of the role played by the electrolyte is taken, in which the electrolyte's ability to resist both local and bulk pH changes is of primary importance. From this viewpoint, the additional $ZnCl_2$ that is included in the electrolyte in accordance with the invention, which is not electrically necessary for the performance of the battery when assembled in accordance with design specifications, and which in fact is accompanied by an electrical performance penalty, becomes an essential ingredient for its pH buffering capacity. In practice, with the new electrolyte formulation reductions of from 60 to 80 percent in the incidence of defective batteries without obvious structural defects have been achieved.

In addition to enabling a considerable reduction in the number of previously inexplicable defects in batteries of the kind described above, the use of a high $ZnCl_2$, high $NH_4Cl$ electrolyte of the kind contemplated by the invention have been found to afford a solution to another vexing problem encountered during the development of a different form of laminar battery, especially intended for use in very high drain applications, such as the recharging of a photographic flash unit.

Of all of the adjuncts to photography now commonly in use, the electronic flash unit is by far the most demanding in its power supply requirements. Before each exposure, a capacitor must be charged with a relatively large amount of electrical energy in as short a time as possible to avoid interference with the photographic process.

Despite the rigorous requirements, batteries have been developed which will provide extremely rapid recharging of electronic flash units and which are still readily accommodated within a film pack. Such batteries are described, for example, in U.S. Pat. No. 4,119,770, issued on Oct. 10, 1978 to Edwin H. Land for electrical cells and batteries and assigned to the assignee of this invention.

Having attained the objectives of providing the desired electrical capacity in the intended space, attention was focused on efforts to simplify the manufacture of such batteries and to reduce the number of components required.

As described in U.S. Pat. No. 4,119,770, the essential elements of a cell for use in batteries meeting the above requirements comprise a slurry cathode in the form of a dispersion of manganese dioxide and carbon particles in an aqueous Leclanché electrolyte, a cellophane separator, a solid electrode in the form of a dispersion of zinc and carbon particles in a binder deposited on a conductive plastic substrate, and a layer of gel electrolyte between the zinc electrode and the separator.

One approach to the simplification of the structure described in U.S. Pat. No. 4,119,770, exemplified in U.S. Pat. No.4,105,815, involves the replacement of the solid zinc electrode and the gel electrolyte layer with a zinc electrode in the form of a slurry of zinc and carbon particles in aqueous electrolyte. The manufacture of batteries in this form still requires the incorporation of two wet components per cell on line in the battery assembly process.

Other approaches to the problem, in which the solid zinc electrolyte is retained while the gel electrolyte is omitted, are exemplified in U.S. Pat. Nos. 4,125,684; 4,125,685 and 4,161,815 and, most recently, in U.S. application for Letters Patent Ser. No. 295,269, filed on Aug. 24, 1981 by Paul A. Plasse for Laminar Batteries and Methods of Making the Same and assigned to the assignee of this invention. The constructions proposed in these patents, and in the cited copending application, differ in many respects, and in particular in the different ways that are proposed for handling the somewhat intractable cellophane separator, which has been found to be by far the best choice for use in a Leclanché cell environment intended for very high drain service. However, an unexpected problem has been encountered in the attempt to devise Leclanché cells without gel electrolyte for use as an electronic flash power supplies.

In recognition of the extreme demands that might be placed on an electronic flash recharging source, testing standards were adopted which were intended to meet the worst tolerable case under which such batteries would be used. For this purpose, as described in detail in U.S. Pat. No. 4,119,770, a test protocol was developed in which an electronic flash unit was charged by the battery, discharged, the battery allowed to rest for 30 seconds, and the discharge and rest cycle repeated to determine the number of cycles that the battery was capable of performing in this way before an undesired length of time was required to recharge the flash unit.

In testing batteries made in accordance with the various constructions proposed in the patents and application cited above in which gel electrolyte was omitted, in most instances it was found that adequate capacity as reflected by this worst case test could be attained. It was anticipated, as a matter of course, that a less rigorous test, during which the batteries would be allowed to rest for longer that 30 seconds between recharge cycles, would demonstrate a reserve capacity that would provide a large safety factor in most situations.

As an excess of precaution, the experiment was made. But instead of exhibiting a capacity for additional recharge cycles with the same recharge time when allowed longer and longer periods of rest between charging cycles, the batteries without gel electrolyte turned out to produce fewer and fewer recharge cycles with increasing rest times. This disquieting discovery meant that the photographer would have to hasten his exposures in order to be sure of getting through the pack.

A second important advantage of cells in accordance with this invention is that a solution is afforded to the problem of the incongruous behavior of gel-less batteries, enabling the manufacture of batteries without the use of gel electrolyte which will be capable of meeting the requirements of electronic flash photography without restriction on the intervals between exposures so long as they are within the expected shelf life of the film units.

Briefly, in this aspect the invention is organized about the discovery that a Leclanché cell can be made with a solid powdered zinc electrode and a slurry cathode, without the use of gel electrolyte, that will both exhibit satisfactory performance with a high duty cycle and a substantially retained capacity under a lighter duty cycle, if the slurry electrode is made with an electrolyte having a restricted range of compositions incorporating a slightly lower amount of ammonium chloride, together with a much higher amount of zinc chloride, than has previously been employed in batteries designed for this service. Comositions most effective for this purpose consist of about eighteen to twenty two percent of ammonium chloride, about twenty five to forty percent of zinc chloride, up to one percent of mercuric chloride, and the balance water, by weight based on the weight of solution. The performance of cells using this electrolyte is particularly surprising in view of the fact that the internal impedance of such cells is appreciably higher than that of those formerly preferred. The lowest possible impedance might be thought to be essential when operating in the inordinately high drain environment of the electronic flash recharging cycle, where the battery is required to operate into loads of as low as 0.75 ohms per cell.

While cells and batteries in accordance with the invention are useful under a wide variety of conditions of current drain and duty cycle, they are particularly well suited for use in the high drain, variable duty cycle environment encountered in the use of electronic flash with photographic equipment. For this purpose, in a preferred embodiment of the invention, cathode compositions in accordance with the invention are used in combination with a cellophane separator, which has the advantages particularly pointed out in the above cited U.S. Pat. No. 4,119,770. Most preferably, the cells are made in accordance with the process described in the above cited copending U.S. application Ser. No. 295,269, in which context various illustrative and preferred embodiments of the invention will be described below.

The invention will best be understood in the light of the following description, together with the accompanying drawings.

In the drawings,

FIG. 3 is a schematic three-quarter perspective sketch of a completed battery in accordance with the invention;

Figure 5:
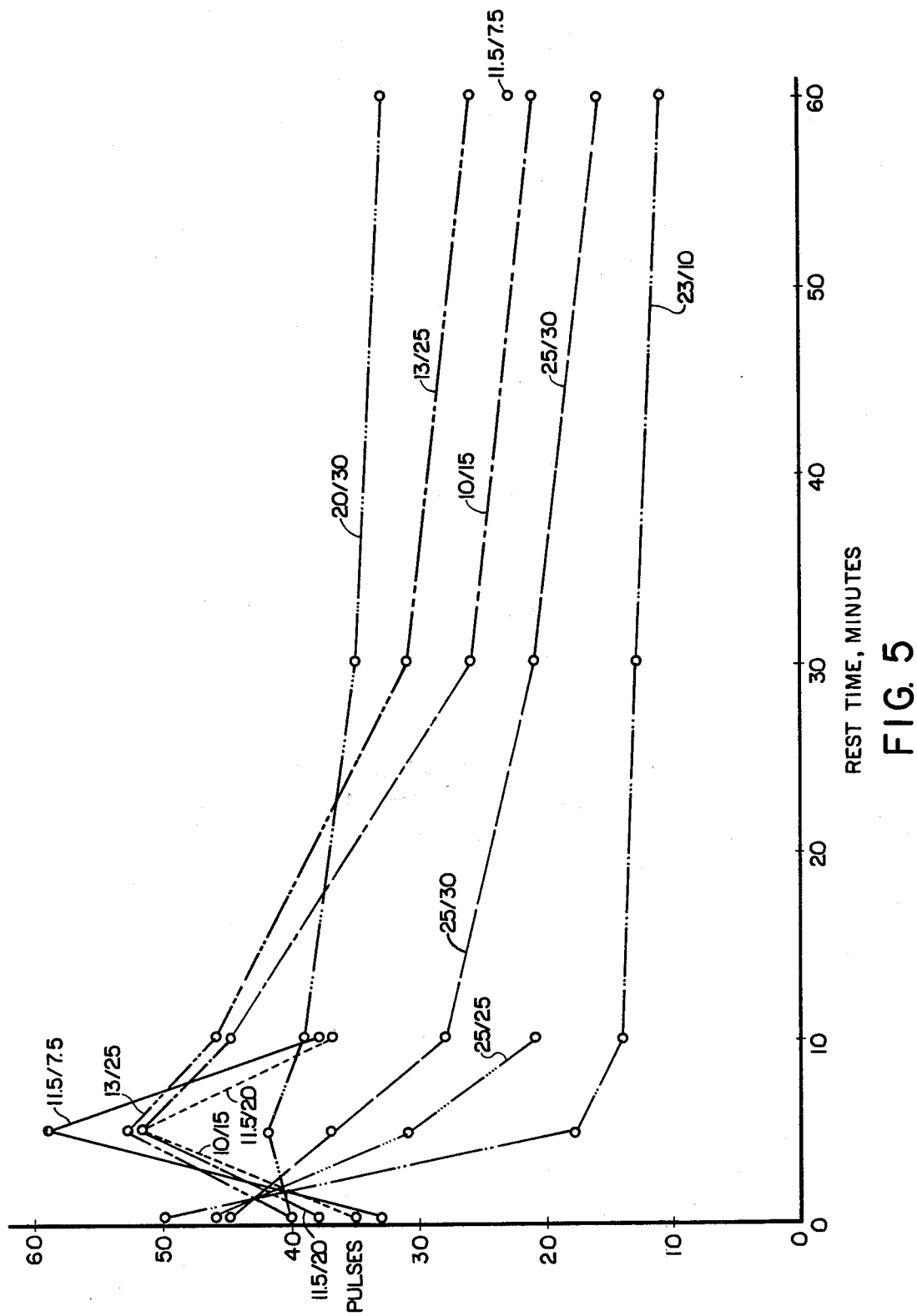

FIG. 4 is a cross-sectional schematic elevational view, with vertical dimensions exaggerated with respect to horizontal dimensions and on an enlarged scale, of a cross-section through the battery of FIG. 3 as seen substantially along the lines 4—4 in FIG. 3; and FIG. 5 is a graph of the number of pulses of a prescribed quantity of energy that can be delivered by batteries incorporating various electrolyte compositions as a function of duty cycle.

As noted above, rigorous stoichiometric considerations have not played a major role in the practical art of battery manufacture. However, a brief discussion of the underlying stoichiometric relationship may be helpful in putting the invention in perspective.

The Leclanché cell is governed by the following overall reaction: $2MnO_2 + Zn + 2NH_4Cl \rightarrow 2MnOOH + Zn(NH_3)_2Cl_2$.

On the basis of this equation, the following mole ratios are involved:

$$\frac{NH_4Cl}{MnO_2} = 1 \quad \frac{NH_4Cl}{Zn} = 2; \quad \frac{Zn}{MnO_2} = 0.5$$

In practice, in various forms of laminar Leclanché cells that have been manufactured, the amounts of $NH_4Cl$ chosen as design operating points have varied from about 25 to about 55 percent of the theoretical, based on the design weight of zinc; and from about 30 to 70 percent of theoretical, based on the $MnO_2$. The design amount of zinc has varied from about 80 to 130 percent of theoretical, based on the $MnO_2$. The rather generous tolerances in the component weights that have been dictated by practical considerations result in even wider variations from the stoichiometric norm.

Leclanché electrolytes for batteries of the kind here considered comprise aqueous solutions of $NH_4Cl$ and $ZnCl_2$, in which $NH_4Cl$ is the major salt component on a weight basis. Typically, such a solution contains from 8 to 12 percent of $ZnCl_2$ and from 18 to 25 percent of $NH_4Cl$ by weight, based on the weight of solution, with the balance water, and, initially, from 1 to 2 percent of $HgCl_2$ for amalgamation of the anode. The initial pH of such a solution is around 4.6. The zinc powder in the anode normally contains amounts of ZnO, typically from 2 to 6 percent, which can increase the pH of the electrolyte to a level, in the range from 5 to 5.8, at which $Zn(NH_3)_2Cl_2$ will begin to precipitate. This tendency is resisted by the cathode, in which the $MnO_2$ acts as a buffering agent.

The tendency for $Zn(NH_3)_2Cl_2$ to precipitate can be expressed as a ratio R of milliequivalents of ZnO per milliequivalent of buffering capacity by $$R = \frac{2000XYA}{81.38\,[uZC + vE]} \quad (1)$$

where A is the weight of anode, x is the concentration of Zn in the anode in weight percent based on the dry weight of anode, Y is the concentration of ZnO in the anode in weight percent based on the weight of zinc, E is the weight of the electrolyte, C is the weight of the cathode, Z is the concentration of $MnO_2$ in the cathode in weight percent based on the dry weight of cathode, v is the number of milliequivalents of ZnO absorbed by the electrolyte in the absence of the cathode, per unit weight of electrolyte, u is the additional number of equivalents of ZnO absorbed by the electrolyte above v at the onset of precipitation of $Zn(NH_3)_2Cl_2$ in the presence of the cathode, per unit weight of $MnO_2$ in the cathode and 81.38 is the molecular weight of ZnO.

In Equation (1), R=1 is the stoichiometric value for precipitation, and values above or below 1 represent excesses or deficiencies of ZnO relative to this value.

If X, Y, A, Z, E and C are taken as the target values, or design values of these variables, and they are subject to tolerances such that the maximum allowable values of X, Y and A are $X(1+x)$, $Y(1+y)$ and $A(1+a)$, and such that the minimum allowable values of Z, E and C are $Z(1-z)$, $E(1-e)$ and $C(1-c)$, then in the worst case from the standpoint of precipitation tendency, the value of R=Rw will be given by $$Rw = \frac{2000X(1+x)\,Y(1+y)\,A(1+a)}{81.38\,[uZ(1-z)\,C(1-c) + vE(1-e)]} \quad (2)$$

The ratio Rw involves the process tolerances, the process quantities, and their stoichiometric relationships. The tolerances are conveniently divided into two groups; the composition tolerances x and z, which are typically small; and the ZnO concentration tolerance and the weight tolerances a, e and c, which are typically considerably larger.

Since the anode and cathode compositions are made up in batches from components that may be measured by weight or volume with considerable precision, it is practical to control them to ±1%, or x=z=0.01.

The concentration of ZnO in the zinc powder is apt to vary from, say, 2 to 6 percent by weight of zinc. If the target value Y is taken as 0.04, or four percent, then $y = 0.5$.

The weight tolerances a, e and c are also typically large. Since the anode and cathode patches are applied by what are basically printing techniques, the control problem is essentially one of controlling coated thickness.

Considering the anode, it is extremely difficult to produce a uniform patch quite as thin as would otherwise be desirable. The probability of void areas in the patch becomes quite high below a dried coating weight of about 9.9 mg/cm². Above about 26.4 mg/cm², it is difficult to obtain uniform adherence. The target value is accordingly set toward the low side of this range, at about 16.5 mg/cm², in conventional practice. Since the density of the dried anode patch is about 4.1 gm/cm³, the difference in coated thickness between the lower limits of 9.9 mg/cm² and the target value of 16.5 mg/cm² is then $$\frac{gm}{1000 \text{ mg}} \times (16.5 - 9.9) \frac{mg}{cm^2} \times \frac{cm^3}{4.1 \text{ gm}} =$$

.0016 cm, or 0.00063 inches

The tolerance on the high side is somewhat more generous, but still represents a small difference in thickness of $$\frac{(26.4 - 16.5)}{4.1 \times 1000 \times 2.54} = 0.00095 \text{ inches}$$

However, this small difference in thickness represents a value of a of $$\frac{26.4 - 16.5}{16.5} = 0.6$$

The cathode target weight is chosen on the basis of essentially the same considerations, typically at a dry coverage of 36.4 mg/cm² corresponding to the anode dry coverage of 16.5 mg/cm². For a conventional 25:1 MnO₂:carbon ratio, this is a mole ratio of MnO₂:Zn of 1.66, as compared with the stoichiometric value of 2.0. Similar tolerances are usually adopted for anode and cathode, i.e., $$\frac{-6.6 \text{ mg}}{cm^2} \text{ to } \frac{+9.9 \text{ mg}}{cm^2}$$

The thickness variation in the cathode is less pronounced with these weight coverage limits, because the density of the dry cathode is about 1.8 gm/cm³, compared with 4.1 gm/cm³ for the anode, so that the upper and lower coverage tolerance allow thickness variations of $$\frac{+9.9}{1000 \times 1.8 \times 2.54} = +0.002 \text{ inches and } \frac{-6.6}{1000 \times 1.8 \times 2.54} =$$

$-0.0014$ inches, respectively.

The value of c in Equation (3) above is then $6.6/36.4 = 0.18$, or 18 percent.

The electrolyte is extruded in two cycles per cell, and is inherently somewhat easier to control on a weight basis because the extrusion process is essentially a volume control operation. The mechanical limits on this process are that too much electrolyte will unduly increase the probability of electrolyte getting into the seal area, and too little will be likely to produce void areas in the deposits. The target value conventionally chosen is equal to that chosen for the anode coating, i.e., about 16.5 mg/cm² per extrusion, with commensurate upper and lower tolerance limits of 26.4 mg/cm² and 9.9 mg/cm², respectively. The density of the electrolyte is considerably less than that of the cathode, so that thickness tolerances are even less onerous. The value of e in Equation (3), with these coating weight tolerances, is $6.6/16.5 = 0.04$, or forty percent.

The various quantities A, E and C in Equations (1) and (2) can be expressed in any consistent units, e.g., in milligrams per square centimeter of electrode area, or in grams for a particular electrode area. In terms of weight, for a typical electrode area of 2.5 inches by 1.875 inches, from the values given above, the coating target weights and tolerances for anode, cathode and electrolyte, per cell, are as follows:

Dry Anode: $A = 0.5$ grams $+ 0.3$ grams $- 0.2$ grams
Dry Cathode: $C = 1.1$ grams $+ 0.3$ grams $- 0.2$ grams
Electrolyte: $E = 1.0$ grams $+ 0.6$ grams $- 0.4$ grams Using these values, the target value $E = 0.5$ gm for the weight of electrolyte per extrusion may be related to the allowed minimum value $E_1 = 0.3$ gm and the allowed maximum value $E_2 = 0.8$ gm as follows:

$$\frac{E_2 - E}{E_2 - E_1} = \frac{.3}{.5} = 0.6$$

The values of $E_1$ and $E_2$ may be taken as representing appoximately equal probabilities of battery failure; at $E_1$, from voids in the electrolyte, and at $E_2$, from defective seals. Since the latter is more undesirable, the choice of E substantially closer to $E_1$ than to $E_2$ is understandable.

With the values of $a = 0.6$, $c = 0.18$, $e = 0.4$ calculated from the parameters conventionally employed as described above, and the values of $x = z = 0.01$ and $y = 0.5$ previously assumed, typical values of the other parameters in Equations (1) and (2) above are:

$X = 0.941$
$Y = 0.04$
$u = 0.8$ millequivalents of ZnO per gram of $MnO_2$
$v = 0.46$ millequivalents of ZnO per gram of electrolyte
$Z = 0.8884$
$A = 16.5$ mg/cm²
$E = 33.0$ mg/cm²
$C = 36.4$ mg/cm²

The corresponding value of R from Equation (1) is $$R = \frac{2000 \times .941 \times .04 \times .5}{81.38 \, [.8 \times .8884 \times 1.1 + .46 \times 1]} = .3725 \tag{1a}$$

From Equation (2), the corresponding value of $R_w$ is $$R_w = \frac{2000 \times .941 \times 1.01 \times .04 \times 1.5 \times .5 \times 1.6}{81.38 \, [.8 \times .8884 \times .82 \times 1.1 \times .99 + .46 \times .6]} = 1.23 \tag{2a}$$

Since this value of $R_w$ is substantially in excess of 1.0, a certain incidence of battery failures arising from $Zn(NH_3)_2Cl_2$ precipitation would be expected and is encountered.

In accordance with the invention, the incidence of such failures is greatly reduced by modifying the electrolyte so that the value of v is greatly increased. As an indication of the size of the increase in v that is necessary to the utility of this approach, consider the value of v needed in the typical case exemplified in Equation (2a) above to reduce the value of Rw below 1; say, to 0.9. For this purpose, Equation (2a) may be rewritten as $$0.9 = \frac{2000 \times .941 \times 1.01 \times .04 \times 1.5 \times .5 \times 1.6}{81.38 \times .8 \times .8884 \times .82 \times 1.1 \times .99 + 81.38 \times .6v} \quad (2b)$$

carrying out the indicated arithmetic, $$0.9 = \frac{91.24}{51.65 + 48.83v}$$

solving for v, $$v = 1.02 \quad (2c)$$

Thus, an increase in v of at least about twofold over the value of 0.46 exhibited by the conventional 22:10 electrolyte would be desirable.

Various aqueous $NH_4Cl$, $ZnCl_2$ solutions were investigated from the standpoint of ability to absorb ZnO without precipitation of $Zn(NH_3)_2Cl_2$ with the criterion upon which the invention is based in mind. The table below lists the results found, in terms of millequivalents of ZnO per gram of electrolyte needed to bring about the precipitation of $Zn(NH_3)_2Cl_2$ as a function of the weight percentage of $ZnCl_2$ and $NH_4Cl$ in water, based on the weight of solution.

| % $NH_4Cl$ | % $ZnCl_2$ | v, MEQZnO/gm electrolyte | pH at crystal formation |
|---|---|---|---|
| 0 | 10 | .15 | 5.52 |
| 0 | 20 | .12 | 5.07 |
| 0 | 30 | .12 | 4.63 |
| 0 | 40 | | pH could not be adjusted to 4.6 |
| 10 | 10 | 1.13 | 5.88 |
| 10 | 20 | 0.76 | 5.35 |
| 10 | 30 | 0.61 | 4.89 |
| 10 | 40 | 0.25 | 4.66 |
| 20 | 0 | 0.12 | 6.34 |
| 20 | 10 | 0.64 | 5.81 |
| 20 | 20 | 0.89 | 5.48 |
| 20 | 30 | 1.70 | 5.13 |
| 20 | 40 | 1.38 | 4.88 |
| 23 | 10 | 0.46 | 5.88 |
| 25 | 0 | 0.25 | 6.37 |
| 25 | 10 | 0.61 | 5.81 |
| 25 | 20 | 0.66 | 5.51 |
| 25 | 25 | 0.86 | 5.24 |
| 25 | 30 | 1.06 | 5.08 |
| 25 | 40 | 1.20 | 4.88 |

Figure 1:
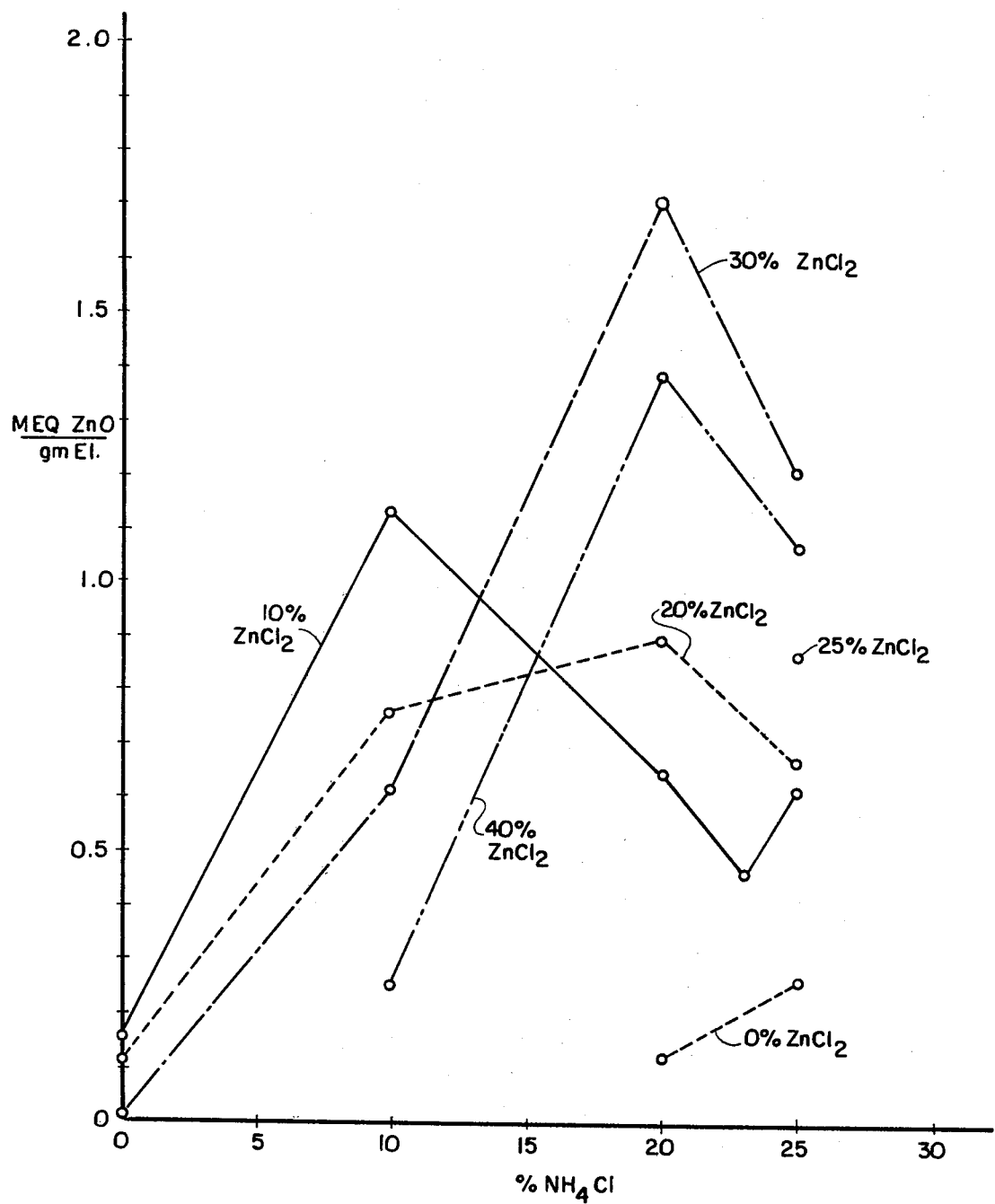
FIG. 1 is a graph of the amount of ZnO that can be absorbed by various aqueous solutions of $NH_4Cl$ and $ZnCl_2$ before precipitation of $Zn(NH_3)_2Cl_2$, as a function of $NH_4Cl$ concentration.
Figure 2:
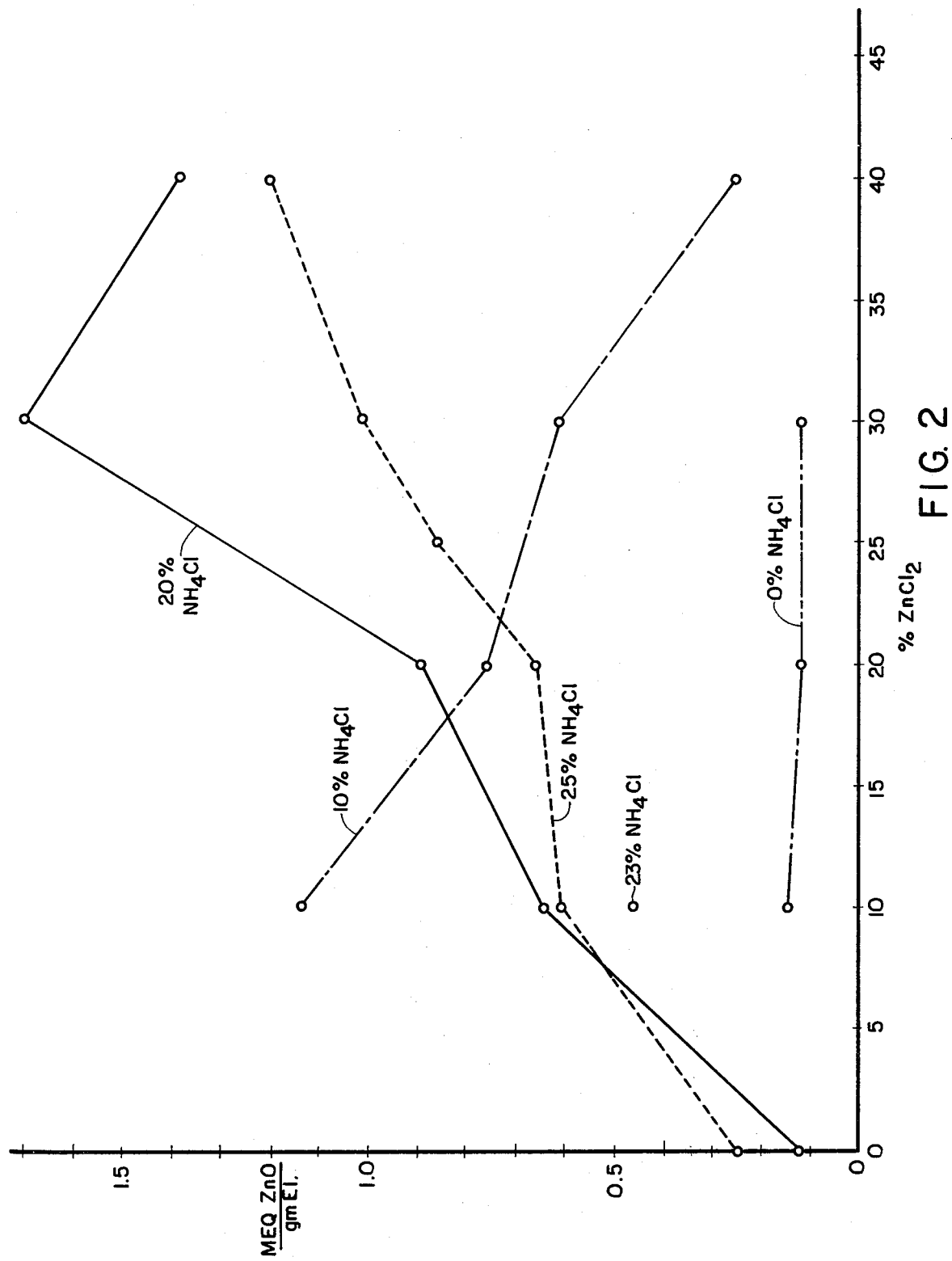
FIG. 2 is a graph similar to FIG. 1, in which the same data are plotted as a function of $ZnCl_2$ concentration.

In general, the pH at the formation of crystals of $Zn(NH_3)_2Cl_2$ goes down with increasing amounts of $ZnCl_2$ at a given level of $NH_4Cl$. However, the behavior of v with concentration is evidently complex. FIGS. 1 and 2 show the data graphically, with v plotted as a function of $NH_4Cl$ in FIG. 1 at various constant levels of $ZnCl_2$, and v plotted in FIG. 2 as a function of $ZnCl_2$ at various levels of $NH_4Cl$. The dashed lines connecting the data points in FIGS. 1 and 2 are merely to associate the data points into groups, and do not necessarily imply a permissible detailed interpolation.

From the standpoint of the rough criterion of Equation (2G) above, various regions in which $v \geq 1$ are evident in FIGS. 1 and 2. One such region is in the vicinity of 10% $NH_4Cl$, 10% $ZnCl_2$. However, of most interest is a region in which the $NH_4Cl$ content is between about 18 and 22 percent (see FIG. 1), and in which the concentration of $ZnCl_2$ is between 25 and 40 percent (FIG. 2). In particular, the solution containing 20 percent $NH_4Cl$ and 30 percent $ZnCl_2$ is apparently in the vicinity of an optimum, having a value of $v = 1.7$ that is considerably in excess of the values for other compositions tested.

Typical four cell laminar batteries made in accordance with prior practice contain electrodes and electrolyte of the following compositions:

| Anode | |
|---|---|
| Component | Weight Percent |
| Zinc Powder | 75.96 |
| $H_2O$ | 19.29 |
| TSPP | 0.056 |
| Bentone LT | 0.14 |
| Polytex 6510 | 4.17 |
| Carbon Black | 0.38 |
| | 100.0 |

In the above composition, TSPP is tetrasodium pyrophosphate; Bentone LT is an organic derivative of hydrous magnesium aluminum silicate, made and sold by National Lead Co., Inc. of N.Y., N.Y.; and Polytex 6510 is an acrylic emulsion resin made and sold by Celanese Corporation of Newark, N.J. The quantities of Polytex 6510 and Calgon 261 LVF are as solids, excluding water.

The above composition is deposited on a conductive plastic substrate and dried, in the manner described in more detail in U.S. Pat. No. 4,119,770, Column 8, lines 40–63. The nominal dry anode weight A was 0.5 grams per patch. From the above composition, the weight percent X of zinc in the dried anode patches would be $$100 \frac{(75.78)}{100 - 19.25} = 94.1\%.$$

| Electrolyte | |
|---|---|
| Component | Weight Percent |
| $ZnCl_2$ | 9.78 |
| $NH_4Cl$ | 20.87 |
| $H_2O$ | 64.34 |
| $HgCl_2$ | 1.73 |
| Calgon 261 LVF | 0.30 |
| Natrosol 250 HHR | 2.98 |
| | 100.0 |

In the above composition, Calgon 261 LVF is a low molecular weight poly(diallyl dimethyl ammonium chloride), as made and sold by Calgon Corporation of Pittsburgh, Pa., and is given on a dry solids basis. The electrolyte was applied in two deposits per cell of 0.5 grams each, +0.3 grams, −0.2 grams. The value of v for this electrolyte, in which the weight ratio of $NH_4Cl$ to $ZnCl_2$ is 2.13, is 0.46 millequivalents of ZnO per gram of electrolyte.

CATHODE

The cathode composition may be of any conventional formulation; for example, that described in detail in U.S. Pat. No. 4,119,770, column 15, lines 45-58. This composition, when applied to a conductive plastic substrate and dried, is as follows, in weight percent based on the total weight of cathode:

| Component | Weight Percent |
|---|---|
| MnO$_2$ | 88.84 |
| Carbon Black | 3.55 |
| BP-100 | 6.01 |
| Versene | 0.37 |
| Tetrasodium Pyrophosphate | 0.89 |
| Lomar D | 0.34 |
|  | 100.0 |

In the above composition, BP-100 is a latex made and sold by Exxon Chemical Co. of Houston, Tex.; Versene is ethylene diamine tetra-acetic acid as sold by Dow Chemical Co. of Midland, Mich.; Lomar D is a dispersing agent sold by Nopco Chemical Co. of Newark, N.J.; and the carbon black is Shawinigan Black, as made and sold by Shawinigan Products Corp., N.Y., N.Y.

The cathode was deposited on a conductive plastic substrate over an area commensurate with the anode area given above, to a target weight C of 1.1 grams per patch, +0.3 grams, −0.2 grams. From a titration of solution of the above electrolyte in the presence of MnO$_2$ with ZnO, it was determined that the equivalent buffering capacity u of the cathode and electrolyte is 0.8 milliequivalents of ZnO per gram of MnO$_2$.

The values of R and Rw for the above compositions and tolerances are found from Equations (1a) and (2a) above to be R=0.3725 and Rw=1.23. This value of Rw corresponds to more ZnO than is required for precipitation, and would predict some incidence of defective batteries. In practice, the tolerances just described have been shown to be associated with a probability of batteries with gross discernable defects of 0.04 to 0.05, and a probability of defective batteries without gross defects, and presumably caused by the avalanche effect here described, of about 0.04, corresponding to an overall yield of good batteries of 91 to 92 percent.

In accordance with a more recent practice, the process described above was modified by raising the target level of electrolyte E* to 1.2 grams per cell, in two 0.6 gram deposits, and tightening the tolerances on the electrolyte to ±3 percent, or ±0.018 grams per cell of gel electrolyte deposit, corresponding to values of e*=0.03 and n=(0.4/0.03)=13.3. No other changes were made in the battery manufacturing process.

From the above parameters, and assuming $$Y(1 + y) = .06 \frac{\text{gm ZnO}}{\text{gm Zn}},$$

Equation (2) above gives $$Rw = \frac{2000 \times .941 \times 1.01 \times .06 \times .5 \times 1.6}{81.38 \,(.8 \times .8884 \times .99 \times 1.1 \times .82 + .46 \times 1.2 \times 9.7)} = .958 \tag{2d}$$

The new value of Rw=0.958 is so close to the critical value of Rw=1.0 that some residual incidence of defects related to a tendency to precipitate would not be unexpected. In practice, the probability of such defects was found to be between 0.015 and 0.020, or an improvement of between 50 and 62.5 percent over the results obtained with the original specifications on E and e. Also of importance, the probability of readily discernable errors involving gross defects was reduced to the range of 0.020 to 0.025, as compared with the range of 0.04 to 0.05 observed with the original specifications, for an improvement (based on the means) of 50 percent.

In accordance with the invention the modified battery manufacturing process just described was further modified by the substitution of the following electrolyte composition for that given above:

| New Electrolyte | |
|---|---|
| Component | Weight Percent |
| ZnCl$_2$ | 27.5 |
| NH$_4$Cl | 18.25 |
| H$_2$O | 47.0 |
| HgCl$_2$ | 1.3 |
| Calgon 261 LVF | 0.8 |
| Natrosol 250 HHR | 2.5 |
| NH$_4$OH | 2.65 |

In the above composition, the components are as previously described, with the exception of NH$_4$OH, which is given as an aqueous solution containing 29 percent NH$_3$ and 71 percent H$_2$O by weight based on the weight of solution; this component was added to adjust the pH of the electrolyte to 4.6. It will be noted that the ratio of NH$_4$Cl to ZnCl$_2$ is $18.25/27.5 = \frac{2}{3}$. The value of v for this electrolyte is 1.7 milliequivalents of ZnO per gram of electrolyte. This electrolyte was used in place of that described above on an equal volume basis with no other changes in the battery manufacturing process.

The density of the electrolyte composition first given above, containing 20.87 percent NH$_4$Cl and 9.78 percent ZnCl$_2$, is about 1.13 gm/cm$^3$. The density of the new electrolyte, containing 18.25 percent NH$_4$Cl and 27.5 percent ZnCl$_2$, is about 1.29 gm/cm$^3$. Thus, the original target level of 1.2 grams per cell corresponds to 1.06 cm$_3$. In order to retain essentially the same process characteristics from a process control point of view, the same volume of the new electrolyte was employed (1.06 cm$^3$), corresponding to a new weight per cell of 1.37 grams. This new value of 1.37 grams also corresponds to the same weight of NH$_4$Cl per cell, or 0.25 grams. With this modification, from Equation (2) above, with other values as in Equation (2d) above, the value of Rw is $$Rw = \frac{2000 \times .941 \times 1.01 \times .06 \times .5 \times 1.6}{81.38\,[.8 \times .8884 \times .99 \times 1.1 \times .82 + 1.7 \times 1.37 \times .97]} = 0.387 \tag{2e}$$

This value is well below those previously considered, and would be expected to result in a marked reduction in defective batteries caused in the manner hypothesized above if the reformulation of the electrolyte in accordance with the invention represents a valid approach to the solution to the problem. In fact, it was found that 220,000 batteries made as described with the new electrolyte exhibited an overall yield of 98 percent 60 days after electrochemical assembly, with an occurrence of defects attributable to the avalanche effect here described of 0.37 percent (probability =0.0037), or an improvement of from 63 to 75 percent over the results obtained by the first improvement in the process described above.

The above practices relate directly to the application of the invention to the construction of batteries comprising dry patch electrodes and gel electrolyte. The application of the invention to series connected laminar Leclanché cells with slurry electrodes will next be described with reference to FIGS. 3 and 4.

FIG. 3 shows a completed laminar battery 1 which, in accordance with a presently preferred embodiment of the invention, may be generally similar in its external appearance to the familiar thin flat battery packaged with a Polaroid SX-70 Land Film pack, except that for the same number of cells and a similar electrical capacity, it will generally be of somewhat smaller major dimensions and somewhat greater in thickness than the conventional battery. In its external aspects, the battery 1 comprises a card 2 of construction paper, cardboard or the like, which may be pigmented on one or both sides and printed with chosen indicia in any desired manner, that serves as the base of the completed battery and is preferably dimensioned to be accepted in the desired power supply receptacle for which the battery is intended, such as a film pack, cassette recorder, calculator, camera or the like.

The card 2 is laminated in selected regions to a battery comprising a set of components 3 to be described in more detail below, over which there is adhered a pocketed terminal sheet 4 of conductive material which is preferably formed with a tab 5 wrapped around the other components 3 of the battery to present an active terminal on the opposite side in a manner generally familiar to those skilled in the art.

An overwrap layer 6 is preferably laminated to the card 2 over the active components of the battery as illustrated in FIGS. 1 and 2. The overlap layer 6 may be of any suitable inert, chemically stable material, and serves primarily to prevent mechanical interference with underlying components during manipulation of the battery. Polyethylene has been successfully employed for this purpose, although it has a tendency to shrink during heat-sealing that may cause other more dimensionally stable materials such as paper, glassine or various commercially available paper-foil laminates to be preferred.

While the battery 1 may comprise one or any desired number of cells, for purposes of convenience and to illustrate a preferred embodiment for many applications, a four cell battery will be described.

Referring to FIG. 4, the card 2 is provided with a pair of perforations 7 and 8 through which the positive and negative terminals of the battery are accessible. It will be apparent to those skilled in the art as the description proceeds that the battery to be described could be assembled with an anode adjacent the card 2 and a cathode as the most remote electrode, or vice versa, but in accordance with a particularly preferred embodiment to be described, the battery is built up from anode to cathode, such that the negative terminal of the battery will be exposed through the aperture 7 in the card 2, and the positive terminal of the battery exposed through the aperture 8.

As shown in FIG. 4, on the card 2 is mounted an insulating base sheet 9 of kraft paper or the like, or most preferably of the material more fully shown and described in U.S. Pat. No. 4,086,400, the latter comprising a laminate of kraft paper, a thermoplastic liquid-impervious resin overlying the paper, and an overlayer on the resin of a heat sealing adhesive. The adhesive layer would be on the top side as seen in FIG. 4. The kraft paper side of the insulating sheet 9 may be selectively laminated to the card 2 by means of one or more stripes of any suitable adhesive, such as poly (ethylene/vinyl acetate), not shown.

The insulating sheet 9 is provided with an aperture 10 in registry with the aperture 7 in the card 2 to expose what, in this case, is the negative terminal of the battery comprising a sheet 11 of metal, preferably a sheet of aluminum foil, for example, of 2 mils in thickness. The metal terminal sheet 11 is laminated to a selected region surrounding the aperture 10 in the insulating sheet 9, and to the peripheral borders of the sheet 9, but is not necessarily, and preferably is not, laminated to the insulating sheet in other regions.

The upper side of the metal terminal sheet 11 is preferably coated with a thin layer of any conventional conductive adhesive, not shown in FIG. 4, typically from 0.1 to 0.8 mils in thickness, and to this conductive adhesive surface is adhered an insulating frame 12a. The frame 12a is formed with a central aperture 13 which serves to receive other electrochemically active components in a manner to be described.

During the lamination of the frame 12a to the metal terminal sheet 11, one or preferably two vent strips 14 are preferably laminated between the frame 12a and the conductive plastic adhesive coated upper surface of the metal terminal sheet 11. The vent strips 14 may be made of paper or the like, which may be embedded in a thermoplastic resin prior to lamination into the structure shown, but are preferably simply laminated into the thermoplastic matrix comprising the frame 12a and the thin layer of conductive primer overlying the metal terminal sheet 11. These vent strips 14 serve to allow the egress of hydrogen formed during the life of the battery, and, together with the surrounding thermoplastic matrix, prevent the loss of appreciable amounts of water or the ingress of oxygen in a manner more fully illustrated and described in U.S. Pat. Nos. 4,105,831; 4,254,191; and 4,256,813, for example.

For convenience in the illustration of the several features of the battery 1 in a single view, the vent strips 14 are shown in FIG. 4 at 90 degrees to their preferred orientation relative to the tab 5. In accordance with the preferred embodiment of the invention, the strips 14 and the tab 5 are both aligned in the machine direction during battery assembly. However, the arrangement shown is equally efficacious in the completed battery.

An anode electrode structure comprising a sheet 15 of conductive plastic over which is coated a layer 16 of active anode material is located principally within the aperture 13 formed in the frame 12a and has external borders extending around and over the aperture 13, with the conductive plastic sheet 15 being laminated to the edges of the frame 12a around the borders of the aperture 13 and the conductive plastic sheet 15 being laminated to the conductive primer side of the conductive metal end terminal sheet 11 as shown in FIG. 4.

The conductive plastic sheet 15 may be made of any conventional material; for example, of Condulon conductive plastic as made and sold by Pervel Industries, Inc. of Plainfield, Conn. The coated anode particle layer 16 may be made of an aqueous composition comprising zinc powder and a little carbon black together with a binder, coated on the conductive plastic sheet and dried, in a manner described more fully, for example, in U.S. Pat. No. 4,119,770 in column 8, lines 40-63. Rather than being patch printed on the conductive plastic, the conductive zinc particle layer is preferably continuously coated on a conductive plastic web and later cut into patches of the kind shown at 15 and 16 in FIG. 4.

A presently preferred zinc anode coating composition, in percent by weight based on the weight of composition, is as follows:

| Component | Weight Percent |
| --- | --- |
| Zinc Powder | 75.78 |
| H$_2$O | 19.25 |
| TSPP | 0.056 |
| Calgon 261 | 0.23 |
| Bentone LT | 0.14 |
| Polytex 6510 | 4.16 |
| Carbon Black | 0.38 |
|  | 100.0 |

In the above composition, TSPP is tetrasodium pyrophosphate; Calgon 261 LVF is a low molecular weight poly (diallyl dimethyl ammonium chloride) as made and sold by Calgon Corporation of Pittsburgh, Pa. Bentone LT is an organic derivative of hydrous magnesium aluminum silicate, made and sold by National Lead Co., Inc. of N.Y., N.Y.; and Polytex 6510 is an acrylic emulsion resin made and sold by Celanese Corp. of Newark, N.J. The quantities of Polytex 6510 and Calgon 261 LVF are as solids, excluding water. This composition is uniformly coated on the conductive plastic substrate and dried.

Overlying the anode layer 16 in FIG. 4 is a separator 20 of any conventional material, but preferably of cellophane approximatley 1.3 mils in thickness and free of hemectants and plasticizers. A fuller description of the properties of cellophane as a separator in an electrochemical system of the type here specifically described by way of illustration appears in above cited U.S. Pat. No. 4,119,770.

For reasons to be described more fully below, the separator 20 is not fully attached along its periphery to the frame 12, but is only selectively adhered thereto by means of stripes of adhesive 21 on either side of the separator along two sides thereof. The adhesive stripes 21 may be of any selected adhesive material, and for example, of poly (ethylene/vinyl acetate), a hot melt polyamide adhesive, or the like.

The components just described, comprising the insulating sheet 9, the metal terminal sheet 11, the frame 12, the conductive plastic layer 15 and its coating 16 of active anode particles, and the separator 20, are preferably formed in a manner described in the above cited copending U.S. application Ser. No. 295,269 as a part of a single composite web which acts as an integral subassembly in the process of manufacturing batteries. Overlying the separator 20 in this structure, as seen in FIG. 4, is a cathode 22 formed as a slurry of manganese dioxide and carbon particles in an aqueous electrolyte containing zinc chloride, ammonium chloride and a small amount of mercuric chloride in the initial assembly of the battery. As will be apparent to those skilled in the art, the mercury constituent of the mercuric chloride readily amalgamates with the zinc layer 16 after assembly of the battery and will not be present in the cathode slurry very long after the assembly of the battery.

In accordance with a presently preferred embodiment of the invention, a cathode slurry mix of the following composition may be employed:

| Component | Weight Percent |
| --- | --- |
| MnO$_2$ | 46.22 |
| Carbon Black | 5.78 |
| ZnCl$_2$ | 14.4 |
| NH$_4$Cl | 9.6 |
| HgCl$_2$ | .24 |
| H$_2$O | 23.76 |
|  | 100.0 |

In the above composition, the carbon black was Shawinigan Black, and the MnO$_2$ was Kerr McGee battery grade electrolytic.

The electrolyte in the above slurry composition amounts to 47.8 percent by weight of slurry. In practice, from 46 to 48 percent is preferred.

If a single cell battery is to be constructed, its next layer would be a composite end terminal 4, in which, for that purpose, it would not usually be necessary to provide a pocket. However, for a multiple cell battery of the type shown in FIG. 4, the next layer over the cathode 22 would comprise another electrode assembly consisting of an electrochemically isolating layer of conductive plastic 15 identical to the lowermost layer 15 described above, on which there is coated on a layer of active anode particles 16 as described previously.

As described above, the second conductive plastic layer 15 is laminated around its edges to a second frame 12b identical to the frame 12a for the lower cell just described. Following assembly of the battery in the form shown in FIG. 4, the layer 15 is in intimate contact with the first cathode layer 22.

The group of components comprising the second frame 12b, with its intercell connector and electrode assembly comprising conductive plastic layer 15 and overlying active anode layer 16, together with another separator 20 adhered in place to the frame 12b by adhesive stripes 21, may be cut from a single composite web that serves as an integral subassembly in the process of manufacturing batteries described in the above cited U.S. application Ser. No. 295,269.

Over the separator 20 attached to the frame 12b as just described is applied another cathode layer 22 of the same composition as the first described above. The assembly just described could be terminated as a two cell battery by adding the terminal assembly 4 as described above. However, in the specific embodiment shown in FIG. 4, a four cell battery is made by adding two more subassemblies comprising frames 12c and 12d, each formed integral with a conductive plastic sheet 15 over which a conductive layer 16 of zinc particles is applied, and over which zinc layer a separator 20 is partly adhered to adjacent portions of the frame by means of adhesive stripes 21.

A cathode layer 22 is deposited on top of each of the structures so described. The uppermost cathode is then covered by the terminal structure 4.

As shown in FIG. 4, the terminal structure 4 comprises a sheet of conductive plastic 23, of Condulon or the like, for example, of 2 mils in thickness, laminated to a cathode end terminal sheet 24 of metal, preferably of aluminum foil 2 mils in thickness and primed on the side adjacent the conductive plastic layer 23 with a thin coat of conductive plastic adhesive employed for the purpose of adhering the conductive plastic sheet 23 to the metal terminal 24 in a manner known in the art per se.

As mentioned above, the end terminal assembly 4 is preferably formed with a pocket comprising a central raised portion 25 as shown in FIGS. 3 and 4. Preferably, the pocketed terminal assembly 4 comprises a sheet of glassine paper 30 adhered to the metal terminal sheet 24 except over the portion comprising the tab 5. The glassine sheet 30 serves as an insulating layer in a manner more fully described in U.S. Pat. No. 4,019,251. The glassine sheet also serves to perform the function of lubricating the die used to form the pocket 25.

While the battery just described in connection with FIGS. 3 and 4 could be assembled by any of the techniques known to those skilled in the art for the assembly of laminar batteries, in accordance with the invention in its preferred embodiment it is assembled by the process described in the above cited U.S. application Ser. No. 295,269.

The performance of batteries made with electrolyte containing various proportions of $NH_4Cl$ and $ZnCl_2$ was investigated by the manufacture of four cell batteries in the manner described above, each containing a three gram cathode and an anode containing 0.480 grams of zinc in each cell. The anode composition was that described above as preferred. The electrolytes employed were of the composition given in table I below in percent by weight based on the weight of solution:

TABLE I

| Example | $NH_4Cl$ | $ZnCl_2$ | $HgCl_2$ | $H_2O$ |
|---|---|---|---|---|
| I | 23 | 10 | 1.12 | 65.88 |
| II | 20 | 30 | 1.04 | 48.96 |
| III | 13 | 25 | 1.30 | 60.70 |
| IV | 11.5 | 20 | 1.11 | 67.39 |
| V | 11.5 | 7.5 | 1.47 | 79.53 |
| VI | 10 | 15 | 1.27 | 73.73 |
| VII | 25 | 30 | 1.04 | 43.96 |
| VIII | 25 | 25 | 1.04 | 48.96 |

Cathode slurries of the compositions given in table II below were made from the above electrolytes. It will be seen that the amount of $HgCl_2$ in the electrolyte composition was chosen to give a fixed composition of 0.5% in the cathode slurry, since with fixed cathode and anode weights it was desired to maintain the same Hg/Zn ratio for amalgamation of the anodes in the completed batteries. The weight percent of electrolyte, based on the weight of slurry, given in the table, was selected to attain reasonably uniform processability in the finished slurries. The ratio of $MnO_2$/carbon in the slurries was 8/1. The carbon black employed was Shawinigan Black, and the $MnO_2$ was Kerr McGee electrolytic battery grade. The compositions are given in weight percent based on the total weight of slurry.

TABLE II

| Ex. | $NH_4Cl$ | $ZnCl_2$ | $HgCl_2$ | $H_2O$ | $MnO_2$ | Carbon | Percent Electrolyte |
|---|---|---|---|---|---|---|---|
| I | 10.24 | 4.45 | 0.50 | 29.32 | 49.33 | 6.17 | 44.5 |
| II | 9.6 | 14.4 | 0.50 | 23.50 | 46.22 | 5.78 | 48 |
| III | 5.02 | 9.65 | 0.50 | 23.43 | 54.58 | 6.82 | 38.6 |
| IV | 5.12 | 9.00 | 0.50 | 30.33 | 48.89 | 6.11 | 45 |
| V | 3.91 | 2.55 | 0.50 | 27.04 | 58.67 | 7.33 | 34 |
| VI | 3.93 | 5.90 | 0.50 | 28.98 | 53.96 | 6.74 | 39.3 |
| VII | 12.00 | 14.40 | 0.50 | 21.10 | 46.22 | 5.78 | 48 |
| VIII | 12.00 | 12.00 | 0.50 | 23.50 | 46.22 | 5.78 | 48 |

During the process of assembling the batteries of the composition given above, perhaps up to ten percent of the water in the cathode slurry would be lost by evaporation. The $HgCl_2$ would be rapidly transformed to $Hg^{++}$ and $Cl^-$ upon amalgamation of the Hg with the anode. Both of these changes would make minor variations in the compositions in the batteries as compared with the "as made" compositions.

Two four cell batteries were made as described above with each of the particular electrolyte compositions given above. For each of five test conditions to be described, with exceptions in which no data is given in the table below, these batteries were tested to determine the number of pulses of 50 watt seconds of energy delivered at a constant current of 2 amperes that they would deliver before reaching a closed circuit voltage of 3.7 volts. The first condition was that a 30 second rest time was allowed between pulses; under the second, third, fourth and fifth test conditions, rest times of 5, 10, 30 and 60 minutes were allowed between pulses. The test results are given in the following table:

TABLE III

| Example | Ratio of $NH_4Cl/ZnCl_2$ in Electrolyte | Rest Time, Minutes | | | | |
|---|---|---|---|---|---|---|
| | | 0.5 | 5 | 10 | 30 | 60 |
| I | 23/10 | 50 | 18 | 14 | 13 | 11 |
| II | 20/30 | 40 | 42 | 39 | 35 | 33 |
| III | 13/25 | 40 | 53 | 46 | 31 | 26 |
| IV | 11.5/20 | 38 | 52 | 37 | | |
| V | 11.5/7.5 | 33 | 59 | 38 | | 23 |
| VI | 10/15 | 35 | 52 | 45 | 26 | 21 |
| VII | 25/25 | 46 | 31 | 21 | | |
| VIII | 25/30 | 45 | 37 | 28 | 21 | 16 |

The results given in Table III are shown graphically in FIG. 5, in which the various curves are identified by ratios of $NH_4Cl$ to $ZnCl_2$, in total percent $NH_4Cl$ to total percent $ZnCl_2$ in the electrolyte, from Table III. It will be seen that the previously standard 23/10 electrolyte shows a drastic loss in performance with increasing rest time between pulses. This loss in performance has been correlated with a buildup of crystals of $Zn(NH_3)_2Cl_2$ in the cells, which for some reason does not occur during the heaviest duty cycle, but increasingly affects the internal impedance of the cells with lighter duty cycles. The 20/30 electrolyte drammatically improves performance in this respect. Since pH tends to increase markedly under heavy discharge, it is speculated that the greatly increased buffering capacity of the 20/30 electrolyte tends to inhibit incipient precipitation under these conditions. The outstanding performance of 23/10 electrolyte under the heaviest duty cycles is ascribed, in this view, to the hypothesis that crystals do not have time to form under these conditions.

As will be seen by comparison of the curves for 23/10, 25/25 and 25/30 electrolyte, increasing the amount of $ZnCl_2$ from 10 percent to 30 percent effects progressive improvement. Decreasing the amount of $NH_4Cl$ produces somewhat anomalous results, except when coupled with an increase in $ZnCl_2$. The electrolytes with lower total salt concentrations, such as 10/25, 13/25, 11.5/7.5 and 11.5/20, all show erratic behavior with increased rest times in comparison with the relatively uniform performance of the 20/30 electrolyte, coupled with a generally impaired performance at 30 second rest times compared with the 23/10 electrolyte. However, this group offers better overall performance in comparison with 23/10.

While the invention has been described with reference to the specific details of various illustrative embodiments, many changes and variations will become apparent to those skilled in the art upon reading this description, and such can obviously be made without departing from the scope of the invention.

Having thus described the invention, what is claimed is:

1. A battery of laminar series connected electrical cells, said cells each comprising a zinc anode, a manganese dioxide cathode, and an electrolyte comprising an aqueous solution of $NH_4Cl$ and $ZnCl_2$ containing from 18 to 22 percent $NH_4Cl$ and from 25 to 40 percent $ZnCl_2$ by weight based on the weight of solution.

2. The battery of claim 1, in which said electrolyte contains about 20 percent $NH_4Cl$ and about 30 percent $ZnCl_2$.

3. A laminar electrical cell especially adapted for high current drains with variable duty cycles, comprising an anodic dispersion of zinc powder containing zinc oxide and adhered to a conductive plastic substrate with a binder, a cathodic dispersion of manganese dioxide and carbon particles in an aqueous electrolyte solution, and a separator between said anodic and cathodic dispersions, in which said electrolyte consists essentially of an aqueous solution of $NH_4Cl$ and $ZnCl_2$ containing from 18 to 22 percent of $NH_4Cl$ and from 25 to 40 percent of $ZnCl_2$ based on the weight of solution.

4. The cell of claim 3, in which said solution contains about 20 percent of $NH_4Cl$ and about 30 percent of $ZnCl_2$.

* * * * *